No. 887,913. PATENTED MAY 19, 1908.
C. L. BOND.
AUTOMATIC WEIGHING SCALE.
APPLICATION FILED JUNE 18, 1904.
2 SHEETS—SHEET 1.
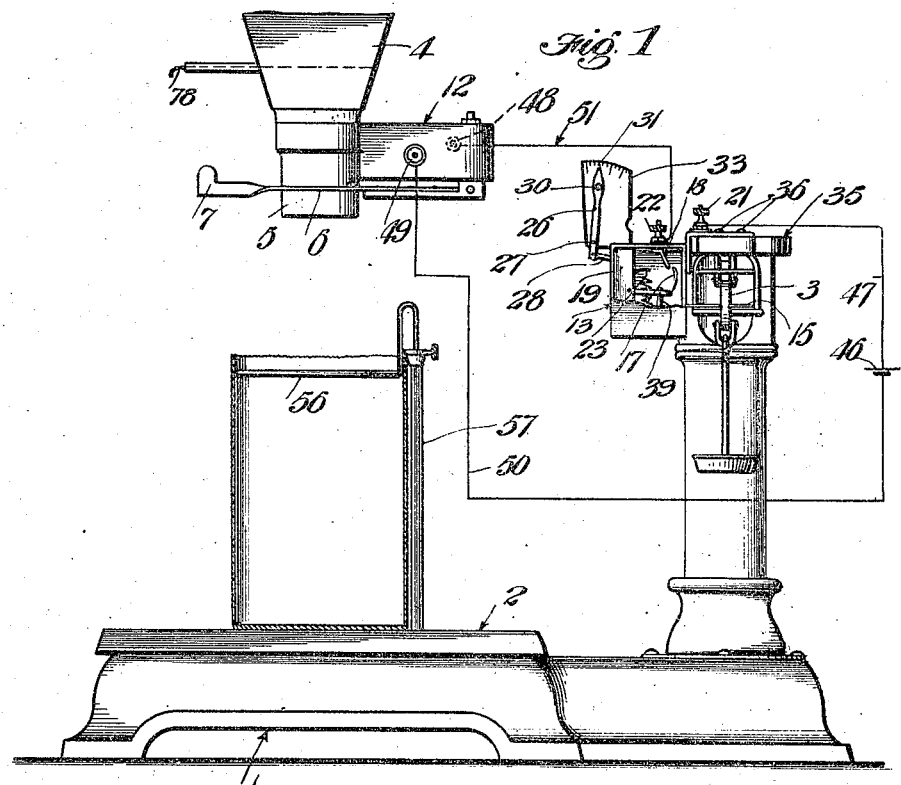
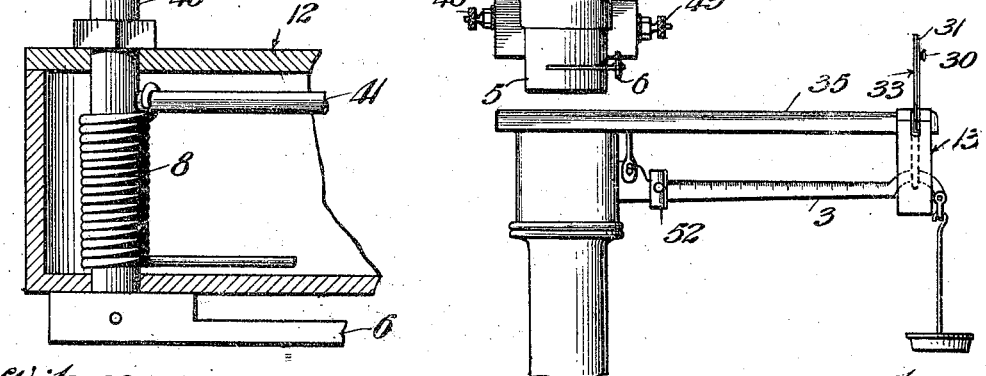
Witnesses
Emma G. Strauss
A. P. Knight
Inventor
Charles L. Bond
by Townsend Bros.
his attys

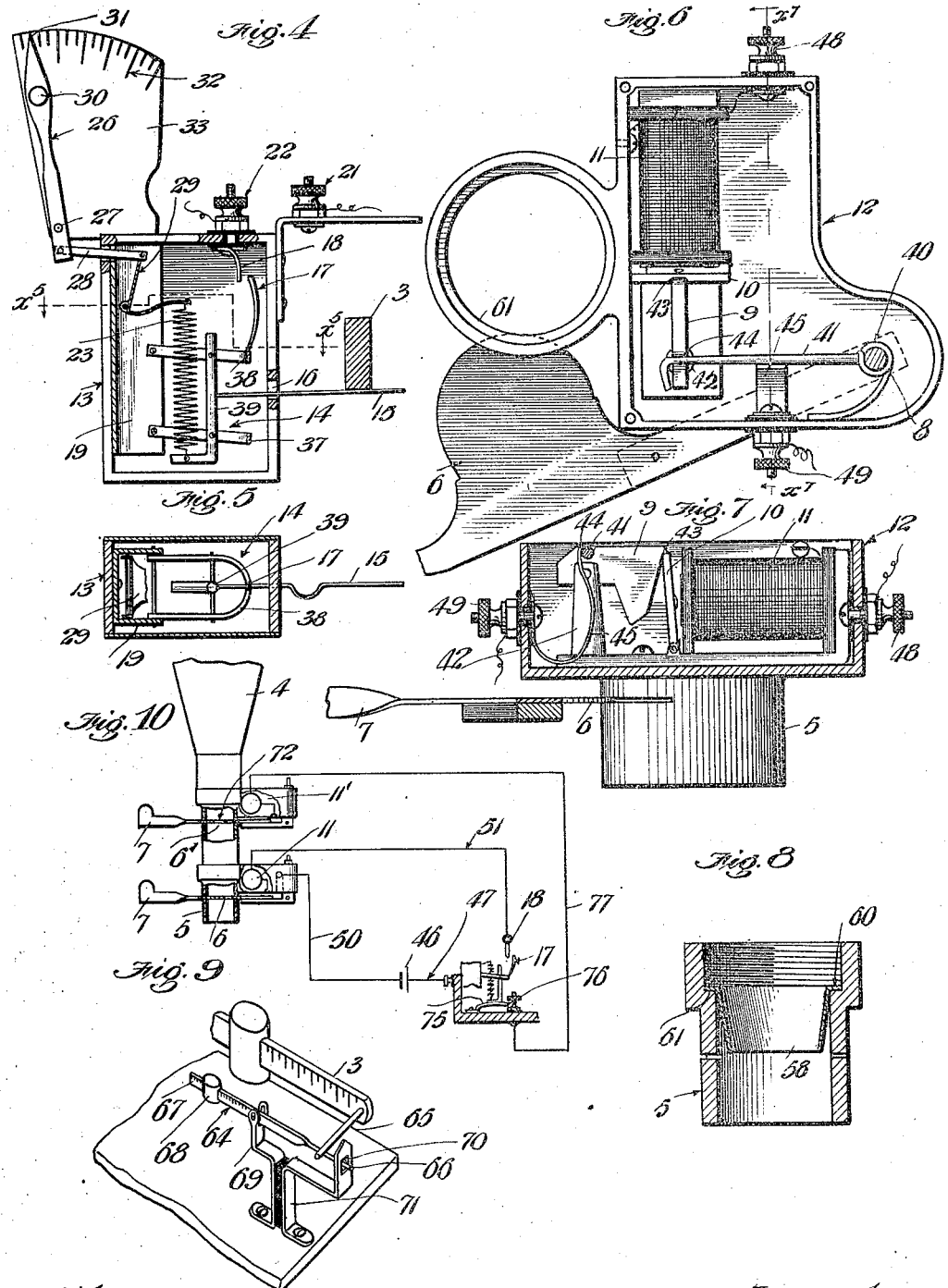

UNITED STATES PATENT OFFICE.

CHARLES L. BOND, OF LOS ANGELES, CALIFORNIA.

AUTOMATIC WEIGHING-SCALE.

No. 887,913.  Specification of Letters Patent.  Patented May 19, 1908.

Application filed June 18, 1904. Serial No. 213,072.

*To all whom it may concern:*

Be it known that I, CHARLES L. BOND, a citizen of the United States, residing at Los Angeles, in the county of Los Angeles and State of California, have invented new and useful Improvements in Automatic Weighing-Scales, of which the following is a specification.

This invention relates to improvements on the scale disclosed in my Patent No. 711,934, dated October 28, 1902. The said weighing scales comprises means adapted to supply material to the scale and to cut off the supply of material, and means for controlling the cut off when the proper amount has left the supply means; and the distinguishing feature of the scales is that the cut-off is so controlled as to make allowance for the weight of the material which has fallen from the supply means and has not yet reached the scale. This weight will vary with the different substances being weighed and this is provided for by a counterbalancing means which is adjustable to compensate for the variation in weight of the material which is falling from the supply means to the scale.

The primary object of the present invention is to provide means for accurately controlling and indicating the adjustment of such compensating and counterbalancing means.

In my prior patent, the construction requires a trial adjustment at each operation for the different materials. Thus, if the scale has been used for weighing coffee, and it is desired to weigh sugar, the operator will have to adjust the set-screw in the manner described in said patent to provide for the different compensation required in that case. It is obvious that this is undesirable on account of the inconvenience and loss of time, but with the construction of my present invention, with an indicator to show the adjustment of the pressure device, it is only necessary to determine once for all, the different adjustments required for different materials, and then from memory or from a tabulated statement, if necessary, the operator can instantly adjust the compensator to the different pressure required for each material without any loss of time and with a minimum of trouble. Thus, if he has been weighing sugar and is about to weigh coffee, a single movement of the controlling index from a given point on the graduated scale to another given point, will make the required change. By my present invention, therefore, the device has been enormously increased in its practical utility.

The cut-off means is electrically controlled by the scale, which operates a suitable contact device, and another object of my invention is to provide a contact device especially suitable for this purpose.

Another object of the invention is to provide improved means for controlling the electric circuit to prevent deterioration of the operating battery or waste of current in case the material weighed is left on the scale.

The accompanying drawings illustrate the invention.

Figure 1 is a side view of the scale. Fig. 2 is an end view thereof. Fig. 3 is a detail elevation of the valve closing parts. Fig. 4 is an elevation of the contact box with the front plate removed. Fig. 5 is a horizontal section on the line $x^5$—$x^5$ in Fig. 4. Fig. 6 is a plan of the electro-magnetically controlled cut-off for the material to be weighed, the top being removed. Fig. 7 is a vertical section on the line $x^7$—$x^7$ in Fig. 5. Fig. 8 is a detail section of the outlet of the delivery, showing a reducing bushing therein. Fig. 9 is a perspective of a different form of the invention. Fig. 10 is an illustration, somewhat diagrammatic, of a form of the invention suitable for weighing large packages.

1 designates the frame of any usual or suitable form of weighing scale having a pan or receiver 2 and a scale beam 3.

4 designates a hopper or container for the material to be weighed having a delivery means or outlet 5 at its lower end controlled by a valve or cut-off plate 6 provided with a handle 7 whereby it may be operated to open the outlet, and a spring 8 which tends to move it to close the outlet. When opened, the valve of the cut-off plate is held in open position by latch means 9 controlled by the armature 10 of the electro-magnet 11 which is connected in circuit with the contact device controlled by the movement of the scale. These parts are desirably inclosed in a case or box 12. The contact means are also desirably inclosed in a suitable box 13 and comprise a frame 14 pivotally mounted in the box and having an arm 15 projecting therefrom through a slot 16 in the box, below and in the path of the scale beam 3; a contact 17 carried by said pivoted frame and a fixed contact 18 secured to the case in position to be engaged by the movable contact 17 as hereinafter explained. The frame 14 being pivoted to the case or to a metallic bracket 19 thereon is in electric connection therewith and through a binding post 21, connected to said case, is in connection with one side of the circuit. The fixed contact 18 is insulated from the box 13 and is connected by a binding post 22 with the other side of the circuit. A spring 23 is attached to the pivoted arm to exert pressure thereon in a direction to move arm 15 toward the scale beam and means are provided for varying the tension or force of said springs; said means consisting, for example, of a handle or lever 26 pivoted at 27 to a fixed support and connected by link 28 and bell crank 29 with one end of the spring. The adjusting lever 26 may have an operating knob 30 and a pointer 31 working over a graduated scale 32 on a plate 33 extending from the case, and snaps into the graduation thereof to hold the index in set position.

The box or case 13 is desirably fastened to the overhanging arm or bracket 35 of the scale frame in such manner as to be detachable therefrom as by screws 36. In order that the pivoted frame 14 shall move with a minimum of friction against the scale beam, it may be formed as a parallel motion device comprising lower and upper members 37, 38, pivoted to the bracket 19 at one end and connected by a tie-bar or link 39, and the spring 23 may be attached to an extension of said tie-bar. The arm 15 which serves as a depression device for the pivoted frame may be formed as an extension from the lower member 37 and the contact device 17 may be formed as an extension from the upper member 38.

The preferred construction of the electromagnet cut-off for the trip device is shown in detail in Figs. 6 and 7. A rock shaft 40 pivoted in the box 12 carries the operating handle 7 which is attached to the said rock shaft outside of the box. An arm 41 on said rock shaft, within the box, swings over the latch plate 9 which is pivoted on a standard 42; said latch plate has a tooth 43 which engages with the top of the armature 10 to hold the latch plate in elevated position and said plate has a shoulder, notch, or cam portion 44 which is engaged by the arm 41, when the handle 7 is operated to lift the latch into position to engage the armature, the arm then seating in the notch and engaging by the action of the spring 8 with the other side of the latch plate notch so as to tend to hold the latch plate against the armature. When the magnet is energized and the armature attracted, the latch plate will fall by gravity and the action of the spring releasing the arm 41 from the notch 44 will allow the arm to be moved by the spring 8 to close the valve or cut-off 6. A contact 45, preferably a spring, is supported on and insulated from the box 12 in position to engage and contact with the arm 41 when the valve has been moved to open position, the contact so established being in the electric circuit of the magnet 11 and the energizing battery, so that as soon as the trip device is released and the valve moves to closed position, the contact will be broken and waste of the battery will be avoided. When the handle is operated to open the valve, the electric connection is reëstablished at this contact so that as soon as connection is made at contacts 17, 19, controlled by the scale, the magnet will be energized. The electric connections are shown in Fig. 1, 46 designating the battery from which connection is made by wire 47 to binding post 21 connected to the movable contact 17 of the scale controlled contact device, the fixed contact 18 thereof being connected through the binding post 22 and a wire 51 to the binding post 48 connected to one end of magnet 11, the other end of which is connected to the box 12. Said box is of conducting material and continues the connection through the rock shaft 40 and arm 41, and when the valve is open, to contact spring 45 and the binding post 49 connected thereto; from said binding post a wire 50 leads to the other side of the battery.

I may provide a holder for the bag or receptacle to be filled, said holder comprising a ring 56 adapted to enter the mouth of the bag and hold it in open position beneath the delivery and a standard or post 57 for supporting said ring.

58, in Fig. 8, designates a reducing bushing that may be provided in the outlet of the delivery to reduce the rapidity of flow therethrough, said bushing having a central orifice of a size adapted to the material to be used or the quantity to be weighed. Thus when the scale is used mostly for weighing very small quantities, this orifice may be correspondingly small, to give sufficient accuracy of action. A flange 60 on the bushing rests on a shoulder 61 of the outlet pipe 5 to retain the bushing in place. 78 is a slide for cutting off the flow entirely.

The operation of the device is as follows:—
Adjusting lever 26 is moved to the position on the graduated scale corresponding to the kind of material that is to be weighed, thus for sugar it will be moved to a certain point, while for coffee it will be moved to another point; the proper position for each material being determined by experiment; it being understood that the position of the adjusting device will in each case be such that the tension of the spring 23 will thereby be made sufficient to compensate for the quantity of material that falls on the scale, after the contact device is operated to close the valve. The operator having adjusted the weight 52 of the scale to the position corresponding to the amount to be weighed, and having placed the bag or other receptacle in position on the scale, and beneath the hopper outlet, he moves the handle 7 to open the valve, thereby simultaneously closing the connection from the battery and electro-magnet trip device to the controlling contact device on the scale. The valve will now be held open by latch means 9 and the material will flow therethrough into the bag or receptacle. The upward pressure of the contact device on the scale beam will cause the latter to rise shortly before the predetermined amount of material has reached the scale, and as the scale beam so rises, the contact device follows it up and immediately closes the contact at 17 and 18, to energize the magnet 11 of the trip device which releases the cut-off, as above explained, and shuts off the supply of material. There will, however, be a certain amount of material falling from the cut-off to the scale or receptacle thereon and the contact device is so adjusted, as above explained, that when this material all reaches the receptacle, just the predetermined weight will be obtained. The release of this trip device also operates to break the electric circuit, as above explained.

The construction of the various parts may be modified to suit various conditions without departing from my invention. One such modification is shown in Fig. 9, wherein the counterbalancing contact device is shown as a supplementary scale 64, pivotally mounted on a standard 69 extending up from the base 1, the beam 3 of the main scale having an arm 65 extending over an arm 66 on said supplementary scale to normally compress the same and elevate the other end of the supplementary scale beam which is provided with a graduated scale arm 67 and a weight 68 adjustable thereon. The end of the arm 66 extends through an opening 70 in a bracket 71 supported on but insulated from the standard 69. The supplementary scale beam and the insulated bracket are connected to wires above referred to, similar to contacts 17 and 18 so that as the arm 66 of the supplementary scale beam rises and touches the top of the opening 68 it will close the electric circuit, as above explained, to release and close the cut-off. The weight 68 being slidable on the graduated scale 67 serves to adjust and at the same time indicate the adjustment of the pressure that the supplementary scale exerts on the main scale. The parallel motion support of arm 15, see Fig. 4, enables said arm to have the same leverage about the pivotal center at different points along its length, so that the effect of the counterbalancing device as indicated by the graduated scale 13 remains the same whatever may be the position of the scale arm over the arm 15. This feature is of value as it maintains the adjustment while allowing the usual longitudinal swing of the balance beam. A similar effect is obtained by the arrangement of depending arm 65 and the arm 66 of the supplementary scale in Fig. 8.

In case very heavy weights are to be measured, it is sometimes desirable to diminish the flow of material toward the end of the weighing so as to render the cut off more accurate. For this purpose, I may use the construction indicated diagrammatically in Fig. 10 wherein a plurality of cut-offs 6, 6', are provided, the upper cut-off having an orifice 72 and the lower cut-off being imperforate. The construction of each of these cut-offs may be identical with that of the cut-off above described, except that in case of the upper cut-off 6' the circuit breaker 45 may be omitted, the two cases being metallically connected by outlet tube 5 and the connection from both cases to the return side of the circuit being controlled by the circuit breaker 45 of the lower cut-off.

A preliminary contact for the contact device is provided, consisting, for example, of a spring 75 located in position to be engaged by the member 39 when the scale beam is depressed, to separate said spring from a fixed contact 76. Spring 75 may be in metallic connection with the case and contact 76 is connected by wire 77 with magnet 11' of the upper cut-off, so that as the scale starts to rise the magnet 11' will first operate to close the cut-off 6', thus reducing the rapidity of flow, and the magnet 11 of the lower cut-off 6 is operated by closure of contacts 17, 18, to totally stop the flow.

The apparatus is thus seen to comprise a pair of graduated scales, each adapted to be readily set by inspection and without trial adjustment at pre-determined weights, the one being auxiliary to the other and adapted to lift the other or main scales from below to assist said other scales when the material thereon and between the same and the cut-off is equal to the total weight desired to be finally weighed, and said main scale is left perfectly free for weighing the material after such assistance has occurred.

What I claim is:—

1. The combination of a weighing scale and a delivery tube for delivery of material thereto, a magnetically controlled cut-off device for said tube, an adjustable counterbalancing device for exerting pressure on the scale to compensate for the weight of the material falling from the cut-off device to the scale after the closure of the cut-off device and moving responsively to the movement of the scale, means for indicating the amount of adjustment of the counterbalancing device, and an electric circuit including contacts controlled by the movement of said counterbalancing device and controlling the magnetic cut-off device.

2. The combination of a weighing scale and a delivery tube for delivering material thereto a cut-off device for said tube, counterbalancing means for exerting pressure on the scale in the same direction as the weight of the material and moving responsively to the movement of the scale, means for adjusting such pressure, and actuating means for said cut-off device controlled by movement of said counterbalancing means, said counterbalancing means comprising a pivoted device having a part extending into position for engaging a moving part of the scale, a spring connected to said pivoted device, and means for adjusting the tension of said spring.

3. The combination of a weighing scale and a delivery tube for delivering material thereto, a cut-off device for said tube, counterbalancing means for exerting pressure on the scale in the same direction as the weight of the material and moving responsively to the movement of the scale, means for adjusting such pressure, and actuating means for said cut-off device controlled by movement of said counterbalancing means, said counterbalancing means comprising a pivoted device having a part extending into position for engaging a moving part of the scale, a spring connected to said pivoted device, means for adjusting the tension of said spring, comprising an index handle, a graduated scale over which the index to the handle moves, and a connection from said index handle to the spring.

4. The combination of a weighing scale, means for delivery of material thereto, a cut-off device for said delivery means, a rock-shaft carrying said cut-off device and provided with an operating handle, a spring connected to the cut-off device for moving it to closed position, an arm connected to the rock shaft, a latch engaged by said arm, a magnet provided with an armature for engaging said latch, a contact engaging said arm when the valve is in open position, and a controlling electric circuit including said magnet and said armature and contact.

5. An automatic weighing scale comprising scale means, delivery means, a reducing cut-off for the delivery means, a total cut-off for the delivery means, a plurality of contacts controlled successively by movement of the scale, adjustable means for exerting pressure on the scale to compensate for the weight of the material falling from the total cut-off to the scale after the closure of the total cut-off, means for indicating the amount of such pressure, and electric circuits and magnets controlled by said contacts to successively operate said cut-offs.

6. The combination of a weighing scale and a delivery tube for delivering material thereto, a cut-off device for said tube, counterbalancing means for exerting pressure on the scale in the same direction as the weight of the material and moving responsively to the movement of the scale, means for adjusting such pressure to compensate for the weight of the material falling from the cut-off device to the scale after closure of said cut-off device, said counterbalancing means engaging with the scale by a part thereof whose leverage is constant along its length, and actuating means for said cut-off device controlled by movement of said counterbalancing means, and provided with means for indicating the amount of adjustment.

7. The combination of a weighing scale and a delivery tube for delivering material thereto, a cut-off device for said tube, counterbalancing means for exerting pressure on the scale in the same direction as the weight of the material and moving responsively to the movement of the scale, means for adjusting such pressure, and actuating means for said cut-off device controlled by movement of said counterbalancing means, said counterbalancing means comprising a parallel motion pivoted device having a part extending into position for engaging a moving part of the scale, a spring connected to said pivoted device, and means for adjusting the tension of said spring.

In testimony whereof, I have hereunto set my hand at Los Angeles, California, this 10th day of June, 1904.

CHARLES L. BOND.

In presence of—
ARTHUR P. KNIGHT
JULIA TOWNSEND.